965X
J. P. PARKE.
ALARM BELL FOR FIRE ENGINES.
X965
Patented Dec. 19, 1808
NO PRINTED SPECIFICATION AVAILABLE
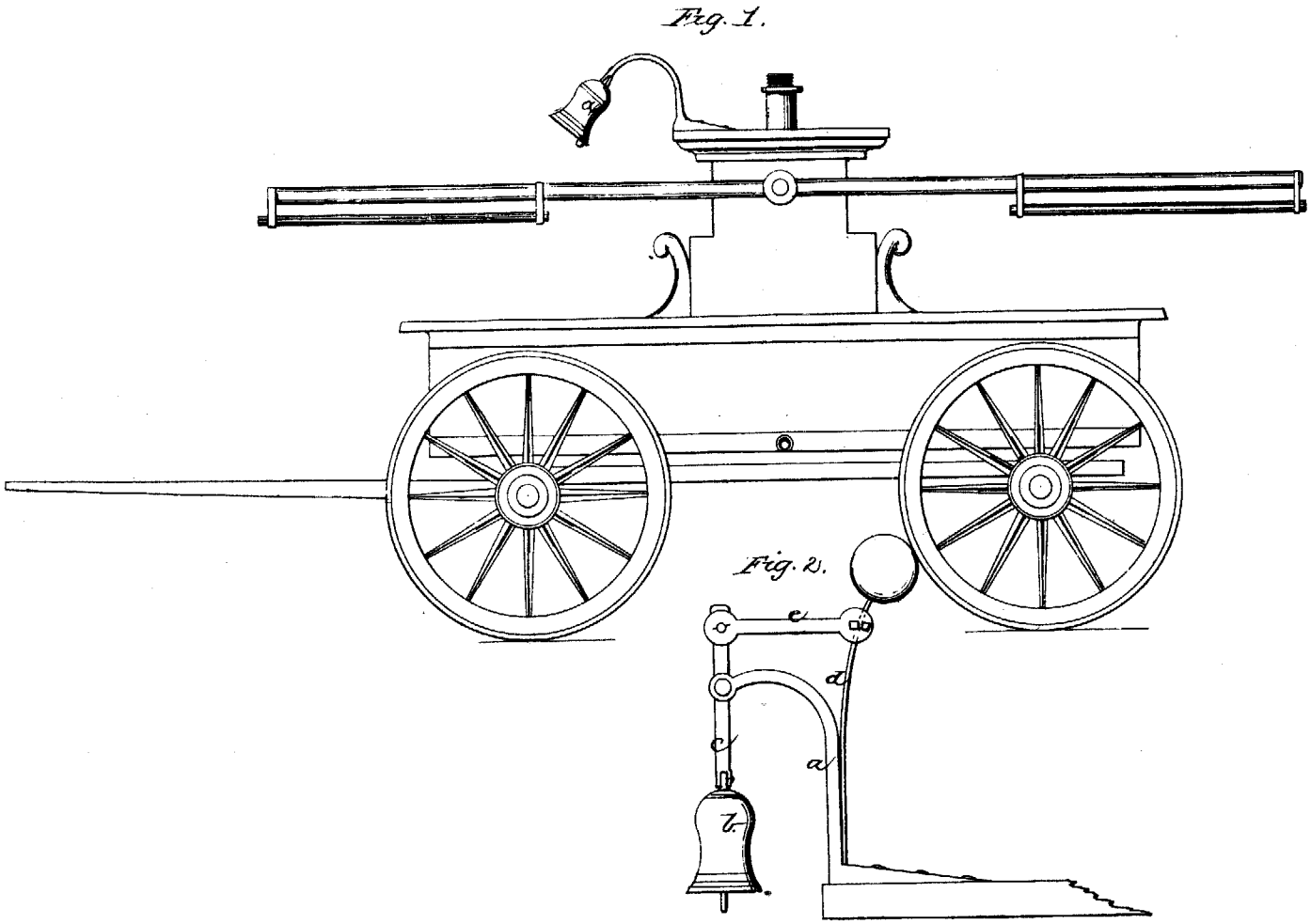

Dec. 19. 1808 965X 269

James. P. Park.

Letters Patent. Issued Dec. 19, 1808.

The Schedule referred to in these Letters Patent and making part of the same containing a description in the words of the said James P Park him self of his "alarm Bell for Fire Engines"

The different methods of producing the alarm are 1st By a simple affixture of the Bell to the carriage Engine or vehicle for the conveyance of fire appa ratus. 2d By the intervention of any machinery to increase or equalize the sound. thus. for example. from the carriage Engine or vehicle for the conveyance of fire apparatus arises a standard of iron two feet in height; the upper part of which is bent in an horizontal direction which horizontal part is nine inches in length. This standard holds sus pended a bell weighing nine pounds by a lever 14 In. long. the cen tre of which plays in a socket formed at the end of the standard. from the bottom of the standard gradually receding arises a spring or inverted pendulum 3 Ft long one inch broad and 1/2 an inch thick capped with a ball of iron or other metal weighing at least 4 lbs. to regulate its motion which spring is connected with the upper end of the lever to which the bell is affixed, by means of an horizontal rod 11 in. in length. at each end of which is a joint or hinge in which the spring and lever play.. so that when the spring is made to vibrate by the motion of the vehicle to which the apparatus is attached a similar action on the bell is produced. 3d. By the application of the power obtained by the revolution of any wheel. or the motion of any lever of the carriage Engine or vehi cle above mentioned or by any other modifications of the apparatus, which may by various ways be effected. through the medium of any of the mechanical powers producing effects similar to those above described Exd.
Wyl Witnesses
Charles J Wister
Abm. Liddon Pennock.

James P. Parke 351 (Words )